March 14, 1961  D. B. BARBIERI ET AL  2,975,225
HIGH TEMPERATURE PROBE
Filed May 24, 1957
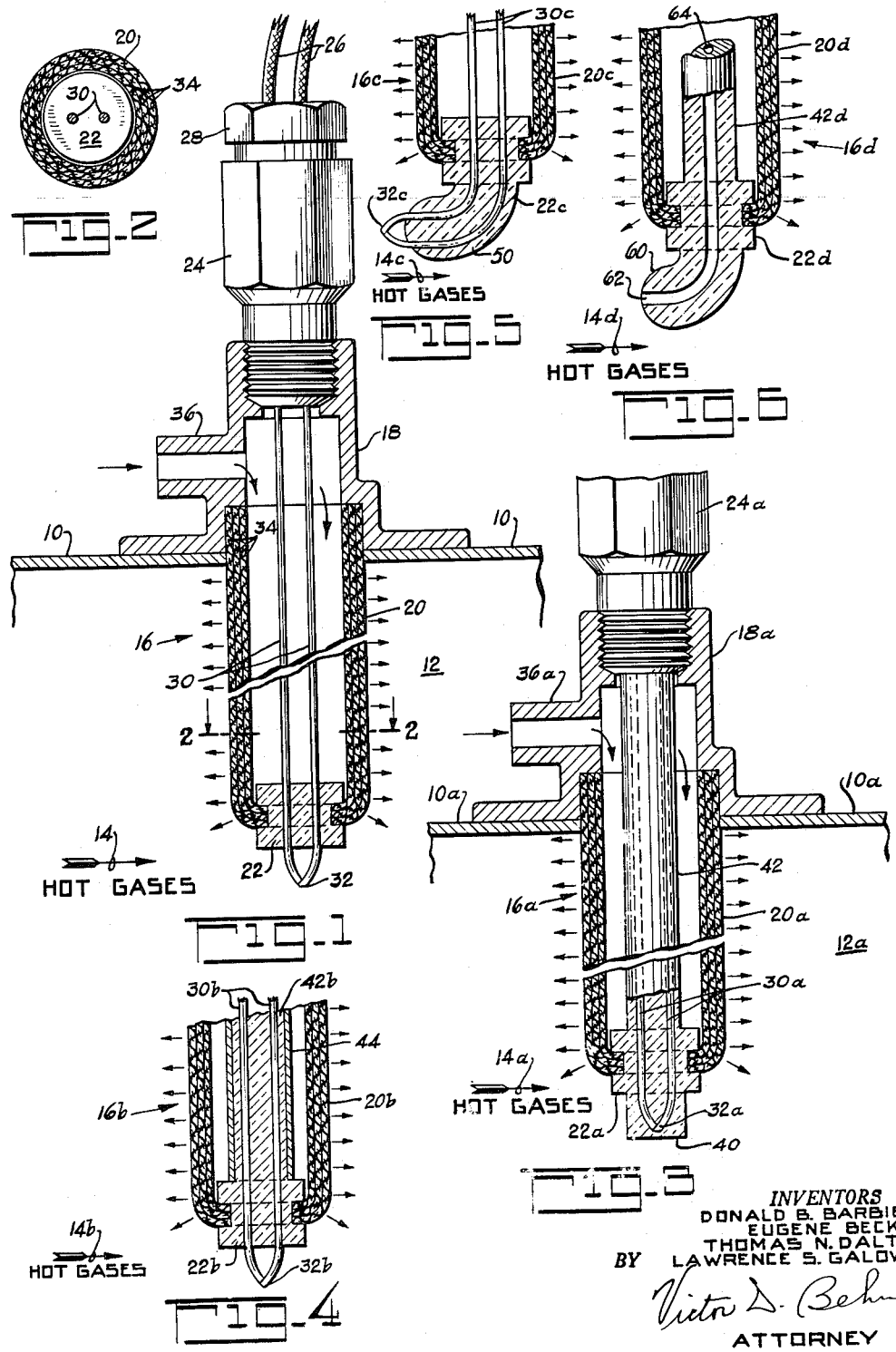
INVENTORS
DONALD B. BARBIERI
EUGENE BECKER
THOMAS N. DALTON
BY LAWRENCE S. GALOWIN
ATTORNEY United States Patent Office 2,975,225
Patented Mar. 14, 1961

2,975,225

HIGH TEMPERATURE PROBE

Donald B. Barbieri and Eugene Becker, Bronx, N.Y., Thomas N. Dalton, Hillsdale, N.J., and Lawrence S. Galowin, Rego Park, N.Y., assignors to Curtiss-Wright Corporation, a corporation of Delaware Filed May 24, 1957, Ser. No. 661,458

9 Claims. (Cl. 136—4)

This invention relates to condition sensing probes and is particularly directed to a probe intended for use in high temperature gases such as a probe having a thermocouple sensing element for high temperatures.

Measurement of the temperature and other conditions of the hot gases in aircraft jet engines is important for proper control and safe operation of such jet engines. At temperatures of 2000° F. and higher existing probes have little or no useful life.

An object of the invention comprises the provision of a novel and simple probe for use in high temperature fluids of at least 2000° F.

A further object of the invention comprises the provision of such a high temperature probe in which said probe is provided with a porous tubular shield the temperature of which is maintained sufficiently low by causing a cooling medium for example air, to bleed outwardly through the pores of said shield to provide a transpiration cooling effect.

A further object of the invention comprises the provision of a high temperature probe having a porous tubular shield in which said shield helps support the probe sensing element. In accordance with the invention said porous tubular shield preferably has a strong laminated construction comprising a plurality of layers of metallic wire cloth with the adjacent wires being bonded together. Such a laminated porous structure may be fabricated in accordance with any of the methods disclosed in application Serial Numbers 650,619, 650,716 and 650,690, filed April 4, 1957.

Other objects of the invention will become apparent upon reading the annexed detailed description in connection with the drawing in which:

Fig. 1 is an axial sectional view through a probe device embodying the invention and having a thermocouple sensing element;

Fig. 2 is an enlarged transverse view taken along line 2—2 of Fig. 1;

Fig. 3 is a view similar to Fig. 1 but illustrating a modified construction; and Figs. 4, 5 and 6 are partial views similar to Fig. 1 but illustrating further modified constructions.

Referring first to Figs. 1 and 2, reference numeral 10 designates the wall of a chamber or duct 12 for hot gases. Thus the wall 10 may comprise the wall of a combustion chamber of a combustion engine, as for example an aircraft jet engine, in which the hot gas flow is as indicated by the arrow 14.

A temperature sensing probe device 16 is mounted on the wall 10 and, as illustrated, said probe is a thermocouple device for measuring the temperature within the chamber 12. The thermocouple device 16 comprises a hollow housing unit 18 supported on the exterior side of the wall 10. A porous tubular sleeve 20 is secured at one end to the housing unit 18 and extends inwardly from said unit through an opening in the wall 10 into the chamber 12 to the point where the temperature is to be sensed. A plug member 22 is secured to and closes the free end of the porous tubular sleeve 20 within the chamber 12. The plug member 22 is of any suitable refractory-like material as for example a ceramic or cermet material. An electric terminal fitting 24 is secured to the housing unit 18, said fitting being disposed at the supported end of the tubular sleeve 20. The wires 26 of a thermocouple circuit are brought into the fitting 24 through a connector 28. The wires 26 are for connection to a temperature measuring and/or control mechanism (not shown). From the fitting 24 the thermocouple wires 30 extend longitudinally through the tubular sleeve 20 to the plug 22 and thence through said plug into the chamber 12 to form a thermocouple hot junction 32 in the chamber 12 adjacent to said plug.

As stated, the tubular sleeve 20 is porous. For this purpose the sleeve 20 preferably comprises a plurality of superimposed layers 34 of wire cloth in which adjacent wires of said layers are bonded together as disclosed in the aforementioned copending applications. Such a laminated wire cloth structure provides a sleeve 20 having a plurality of pores or openings distributed over its entire surface exposed to the hot gases 14. In addition, said laminated wire cloth structure provides a sleeve 20 which furnishes a strong support for the temperature-sensing thermocouple hot junction 32 even though the individual layers 34 of said laminated structure 20 are fine mesh wire cloth. The tubular sleeve 20 is illustrated as comprising three layers of wire cloth. As will be apparent, however the invention is not limited to any specific number or mesh size of the wire cloth layers forming the shield 20.

A suitable cooling medium such as air, or other suitable gas or liquid, is supplied to the housing unit 18 through an inlet connection 36. The cooling air flows into the tubular sleeve 20 at its supported end and out through the pores in said sleeve, as indicated by arrows on the drawing to provide a transpiration cooling effect along the entire surface of the sleeve exposed to the hot gases in the chamber 12.

With the construction described, the tubular sleeve 20 functions as a heat shield for the thermocouple wires 30 and also serves as a strong support for the thermocouple hot junction or sensing element 32.

The particular material of the wires of the thermocouple hot junction depends on the specific use to which the thermocouple is to be put. For example where the chamber 12 is the combustion chamber of a jet engine the two wires of the thermocouple junction 32 may be platinum and a platinum-rhodium alloy. Because of the heat shielding effect provided by the porous sleeve 20 with the cooling medium flowing out through the pores in said sleeve, the temperature within said sleeve is sufficiently low to permit a transition from the hot junction wires 32 to wires 30 of cheaper material within said sleeve.

The thermocouple junction 32, instead of being disposed beyond the end of the refractory plug 22 in the chamber 12 as in Fig. 1 may be embedded within the plug. Such a modification is illustrated in Fig. 3. Fig. 3 also shows an electric insulating support around the wires leading to the thermocouple hot junction. For ease of understanding the parts of Fig. 3 corresponding to parts of Fig. 1 have been designated by the same reference numerals as said corresponding parts but with a reference numeral $a$ added thereto.

In Fig. 3 the plug 22a has an extension 40 within which the thermocouple junction 32a is embedded. With this arrangement the refractory plug member extension 40 protects the thermocouple junction 32a from any deleterious chemical reaction with the hot gases in the chamber 12. Since the temperature at the thermocouple junction 32a is a measure of the temperature of said hot gases any temperature indicator and/or control circuit to which the thermocouple 32a may be connected can be calibrated to respond to the temperature of said hot gases.

Fig. 3 also shows a tubular electric insulating member 42 within which the thermocouple wires 30a are embedded to provide electric insulation about said wires. Obviously a similar insulating member may be used about the wires 30 in Fig. 1. The insulating member 42 extends from the plug 22a at one end of the sleeve 20a into the terminal fitting 24a at the supported or other end of said sleeve. If desired the insulating member 42 may be integral with the plug member 22a, as illustrated. Fig. 3 is otherwise like Fig. 1 and therefore no further description of Fig. 3 appears to be necessary.

In both Figs. 1 and 3 it is important that none of the cooling air supplied into the tubular porous sleeve finds its way to the thermocouple hot junction. Thus in Fig. 1 it is important that the wires 30 be bonded to the plug 22 so that air cannot leak along said wires from within the sleeve 20 to the thermocouple hot junction 32. In Fig. 3 the insulating member 42 must be impervious to the cooling air since for example any crack in the electric insulating number 42 may result in cool air finding its way through said crack and thence along one of the wires 30a down to the thermocouple hot junction 32a to cool said junction. To minimize this possibility, a metallic member may be bonded about said electric insulating member. Such a modification is shown in Fig. 4.

The parts of Fig. 4 corresponding to the parts of Figs. 1 and 3 have been designated by the same reference numerals as said corresponding parts but with a subscript $b$ added thereto. In Fig. 4 a metallic tube 44 is disposed about the electric insulator extension 42b throughout the length of said insulator extension and is sealingly bonded to said insulator extension at least at the ends of said sleeve to prevent cooling air from approaching the thermocouple hot junction through cracks in said insulator extension. In Fig. 4 the thermocouple hot junction 32b may be embedded within an extension of the plug 22b as in Fig. 3 or, as illustrated and as in Fig. 1 said junction may be disposed beyond the plug within the hot gases in the chamber 12. Fig. 4 is otherwise like Figs. 1-3 and therefore no further description of Fig. 4 is necessary.

Fig. 5 illustrates an arrangement to minimize any effect on the thermocouple hot junction, of leakage of the cooling air along the thermocouple wires if such leakage should take place. The parts of Fig. 5 corresponding to the parts of Figs. 1-4 have been designated by the same reference numerals as said corresponding parts but with a subscript $c$ added thereto. In Fig. 5 the plug member 22c has a projection 50 which turns in an upstream direction. The thermocouple wires 30c extend through the projection 50 to form a thermocouple hot junction 32c upstream of the projection 50. With this arrangement, if any cooling air leakage occurs along the wires 30c through the plug member 22c and its projection 50, such leaking air is turned downstream as soon as it immerges from the plug projection 50 by the hot gas flow 14c over said projection. Hence with the arrangement of Fig. 5, if such leakage of cooling air along the thermocouple wires 30c should occur it would have little or no effect on the temperature at the thermocouple hot junction 32c. Preferably the thermocouple hot junction 32c is disposed upstream of the upstream side of the porous sleeve 20c to minimize the possibility of any cooling of the thermocouple hot junction 32c by the cooling air flowing through the pores of said porous sleeve.

The invention is not limited to a temperature sensing probe such as the probes of Figs. 1-5. Thus the invention is applicable to any condition sensing probe which can be used for sensing the condition of a high temperature fluid. Fig. 6 illustrates the invention applied to a fluid pressure probe for sensing the total pressure of a stream of hot gases.

The parts of Fig. 6 corresponding to the parts of Figs. 1-4 have been designated by the same reference numerals as said corresponding parts but with a subscript $d$ added thereto. In Fig. 6 the plug member 22d has an extension 60 for a pressure sensing opening 62 which is directed upstream into the hot gas flow 14d whereby the extension 60 constitutes a total head tube having pressure sensing opening 62. The fluid total pressure sensed by the total head tube 60 is transmitted by the passage 64 to the other end of the pressure probe device 16c from which it is transmitted to measuring and/or control mechanism (not shown). The structure of Fig. 6 is otherwise like that of Figs. 1-5.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A probe device for providing a signal of the temperature of a fluid; said device comprising an outer tubular sleeve exposed for contact with said fluid and having a multitude of small openings substantially uniformly distributed over its surface such that said sleeve is porous; support means connected to one end of said sleeve for supporting said device; a thermocouple junction secured to the other end of said sleeve for sensing the temperature of the fluid; electric wires connected to said thermocouple junction and disposed within and extending from said thermocouple junction to said supported end of the sleeve for transmitting a signal of said temperature; and passage means for supplying a cooling medium to said sleeve at its said supported end for flow of said cooling medium outwardly through the pores of said sleeve into said fluid.

2. A probe device as recited in claim 1 in which said porous tubular sleeve comprises a plurality of layers of metallic wire cloth having adjacent wires of said layers bonded together.

3. A temperature sensing device as recited in claim 1 and including a plug member of refractory material disposed at and secured to the thermocouple junction end of said porous sleeve for supporting said thermocouple junction.

4. A probe device as recited in claim 3 in which said porous tubular sleeve is a laminated structure comprising a plurality of layers of wire cloth in which the adjacent wires of said layers are bonded together.

5. A probe device as recited in claim 3 in which said thermocouple junction is embedded in said plug member.

6. A probe device as recited in claim 3 in which said thermocouple junction projects beyond said plug member into said fluid.

7. A probe device as recited in claim 3 in which said thermocouple junction projects beyond said plug member and beyond one side of said device.

8. A probe device as recited in claim 3 and including insulation means impervious to said cooling medium and disposed about said electric wire connections.

9. A probe device as recited in claim 8 and including a metallic sleeve impervious to said cooling medium and disposed about said insulation means for substantially the entire length of said insulation means and having a sealed connection therewith.

References Cited in the file of this patent

UNITED STATES PATENTS

| | | |
|---|---|---|
| 1,286,429 | Shindel | Dec. 3, 1918 |
| 1,849,832 | Herzog et al. | Mar. 15, 1932 |
| 2,415,187 | Moore | Feb. 4, 1947 |
| 2,456,070 | Malek et al. | Dec. 14, 1948 |
| 2,493,078 | Mead | Jan. 3, 1950 |
| 2,761,005 | Chamberlain et al. | Aug. 28, 1956 |
| 2,775,640 | Steeves | Dec. 25, 1956 |
| 2,820,839 | Schunke | Jan. 21, 1958 |
| 2,820,840 | Cantlin et al. | Jan. 21, 1958 |
| 2,833,844 | Burton et al. | May 6, 1958 |
| 2,870,233 | Comer | Jan. 20, 1959 |